US011032076B2

(12) United States Patent
Venkataraman

(10) Patent No.: US 11,032,076 B2
(45) Date of Patent: Jun. 8, 2021

(54) SYSTEM AND METHOD FOR TESTING AUTHENTICATION AND REVIEWING IMPLEMENTATION PROCESSES OF AN APPLICATION PROGRAMMING INTERFACE IN A SOFTWARE DEVELOPMENT PLATFORM

(71) Applicant: VISA INTERNATIONAL SERVICE ASSOCIATION, San Francisco, CA (US)

(72) Inventor: Jaishankar Kumar Venkataraman, Austin, TX (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 105 days.

(21) Appl. No.: 16/439,375

(22) Filed: Jun. 12, 2019

(65) Prior Publication Data
US 2020/0396073 A1    Dec. 17, 2020

(51) Int. Cl.
| | |
|---|---|
| *H04L 29/06* | (2006.01) |
| *H04L 9/32* | (2006.01) |
| *G06F 9/54* | (2006.01) |
| *H04L 9/08* | (2006.01) |

(52) U.S. Cl.
CPC ............ *H04L 9/3213* (2013.01); *G06F 9/547* (2013.01); *H04L 9/085* (2013.01); *H04L 9/3297* (2013.01)

(58) Field of Classification Search
CPC ..... H04L 9/3213; H04L 9/085; H04L 9/3297; H04L 2209/26; H04L 9/0825; H04L 63/00; G06F 9/547
See application file for complete search history.

(56) References Cited

U.S. PATENT DOCUMENTS

| | | | |
|---|---|---|---|
| 9,712,503 B1* | 7/2017 | Ahmed | G06F 21/606 |
| 9,800,603 B1* | 10/2017 | Sidagni | H04L 63/1433 |
| 2013/0084896 A1* | 4/2013 | Barkie | H04W 12/02 |
| | | | 455/466 |

(Continued)

OTHER PUBLICATIONS

Panagiotou et al., "Design and Implementation of a Privacy Framework for the Internet of Things (IoT)", 21st Euromicro Conference on Digital System Design (DSD), Date of Conference: Aug. 29-31, 2018.*

*Primary Examiner* — Morshed Mehedi
(74) *Attorney, Agent, or Firm* — Loeb & Loeb, LLP

(57) ABSTRACT

A system and method may simplify API design maintenance by providing an interface for configuring cryptographic parameters in the development of secure APIs to allow configuring MLE and X-Pay parameters, testing MLE and X-Pay-supported APIs, and directly viewing decrypted output of APIs which requires MLE. Rather than a pre-configured key store or creating a key store for each API, the system may refer to stored credentials and certificates to make, Mutual SSL and X-Pay token calls within the developer playground and create the key store programmatically. The configuration may be saved in a JSON format so that it may be reused at a later stage for retesting and also may allow saving the complete configuration including credentials, end point, request and response payload so that there is no need to update credentials in a centralized place. The solutions described herein may also eliminate sharing the private key over a network.

20 Claims, 7 Drawing Sheets

(56) References Cited

U.S. PATENT DOCUMENTS

| | | | |
|---|---|---|---|
| 2016/0105408 A1* | 4/2016 | Cooper | H04L 63/0428 |
| | | | 726/3 |
| 2018/0048627 A1* | 2/2018 | Reese | H04L 63/02 |
| 2019/0340564 A1* | 11/2019 | Holmquist | H04L 43/0876 |

* cited by examiner

SYSTEM AND METHOD FOR TESTING AUTHENTICATION AND REVIEWING IMPLEMENTATION PROCESSES OF AN APPLICATION PROGRAMMING INTERFACE IN A SOFTWARE DEVELOPMENT PLATFORM

BACKGROUND

Some application programming interfaces (APIs) require payload encryption and decryption. To implement this feature, some developer platforms employ payload encryption and decryption using message level encryption (MLE). MLE allows developers to encrypt upstream data using a combination of an RSA public/private key-pair and an Advanced Encryption Standard (AES) session key. Some open source Representational State Transfer (REST) tools and RESTful Web services (RWS) tools used by developers on these platforms (e.g., SOAP UI, Postman, etc.) do not include support for MLE. This requires developers using these open-source tools to create code to validate their APIs that use payload encryption and decryption for the platform. This extra step of creating code to validate for MLE while also coding the API within the platform is time consuming and detracts from the main task of writing the API.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

The disclosure presents practical applications to software design and API maintenance by providing an interface for configuring cryptographic parameters in the development of APIs. For example, the systems and methods described herein configure MLE, X-Pay, and Mutual SSL parameters, test MLE, X-Pay, and Mutual SSL-supported APIs, and directly view decrypted output of APIs which requires MLE. Rather than a pre-configured key store or creating a key store for each API, the system may refer to downloaded credentials and certificates to make MLE, Mutual SSL, and X-Pay token calls within the developer platform and create the key store programmatically. The configuration may be saved in a JSON format so that it may be reused at a later stage for retesting. Saving in JSON allows saving the complete configuration including credentials, end point, request and response payload so that there is no need to update credentials in a centralized place. As a standalone application, the solutions described herein may also eliminate the need to share the private key over a network. The solutions described herein may support developing APIs that include various authentication methods including MLE, Mutual SSL, and X-Pay token without needing any Groovy script to call an X-Pay token API, or MLE API.

In some embodiments, a processor-implemented method for implementing encryption and decryption in an application programming interface (API) developer platform comprising processor-implemented instructions. The instructions may include receiving a representational state transfer (REST) request for a secure API object and determining an authentication method for the secure API object. In response to determining that the authentication method includes an X-Pay Token, the instructions may also include creating an X-Pay token request for the secure API object using a shared secret key and an API key and sending the X-Pay Token request for the secure API object to a gateway for the API developer platform. In response to determining that the authentication method includes Mutual SSL, further the instructions may include determining whether the secure API object is MLE-enabled. In response to determining that the secure API object is MLE-enabled, the method may include further processor-executable instructions for encrypting a portion of the REST request using an MLE credential, and creating a Mutual SSL request for the secure API object using at least a Mutual SSL certificate and a Mutual SSL credential. The method may also include instructions for sending the Mutual SSL request to the gateway for the API developer platform, accessing a secure object database using the authentication method, and sending a REST response to the REST request, the REST response including the secure API object.

In further embodiments, a system for implementing encryption and decryption in an application programming interface (API) developer platform may comprise at least one processor and memory including instructions that are executable by the processor. The instructions may include receiving a representational state transfer (REST) request for a secure API object and determining an authentication method for the secure API object. In response to determining that the authentication method includes an X-Pay Token, the instructions may also include creating an X-Pay token request for the secure API object using a shared secret key and an API key and sending the X-Pay Token request for the secure API object to a gateway for the API developer platform. In response to determining that the authentication method includes Mutual SSL, further the instructions may include determining whether the secure API object is MLE-enabled. In response to determining that the secure API object is MLE-enabled, the method may include further processor-executable instructions for encrypting a portion of the REST request using an MLE credential, and creating a Mutual SSL request for the secure API object using at least a Mutual SSL certificate and a Mutual SSL credential. The method may also include instructions for sending the Mutual SSL request to the gateway for the API developer platform, accessing a secure object database using the authentication method, and sending a REST response to the REST request, the REST response including the secure API object.

BRIEF DESCRIPTION OF THE FIGURES

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

DETAILED DESCRIPTION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, components, or devices. Accordingly, the present invention may take the form of an entirely hardware embodiment, an entirely software embodiment, or an embodiment combining software and hardware aspects. The following detailed description is, therefore, not to be taken in a limiting sense.

Figure 1:
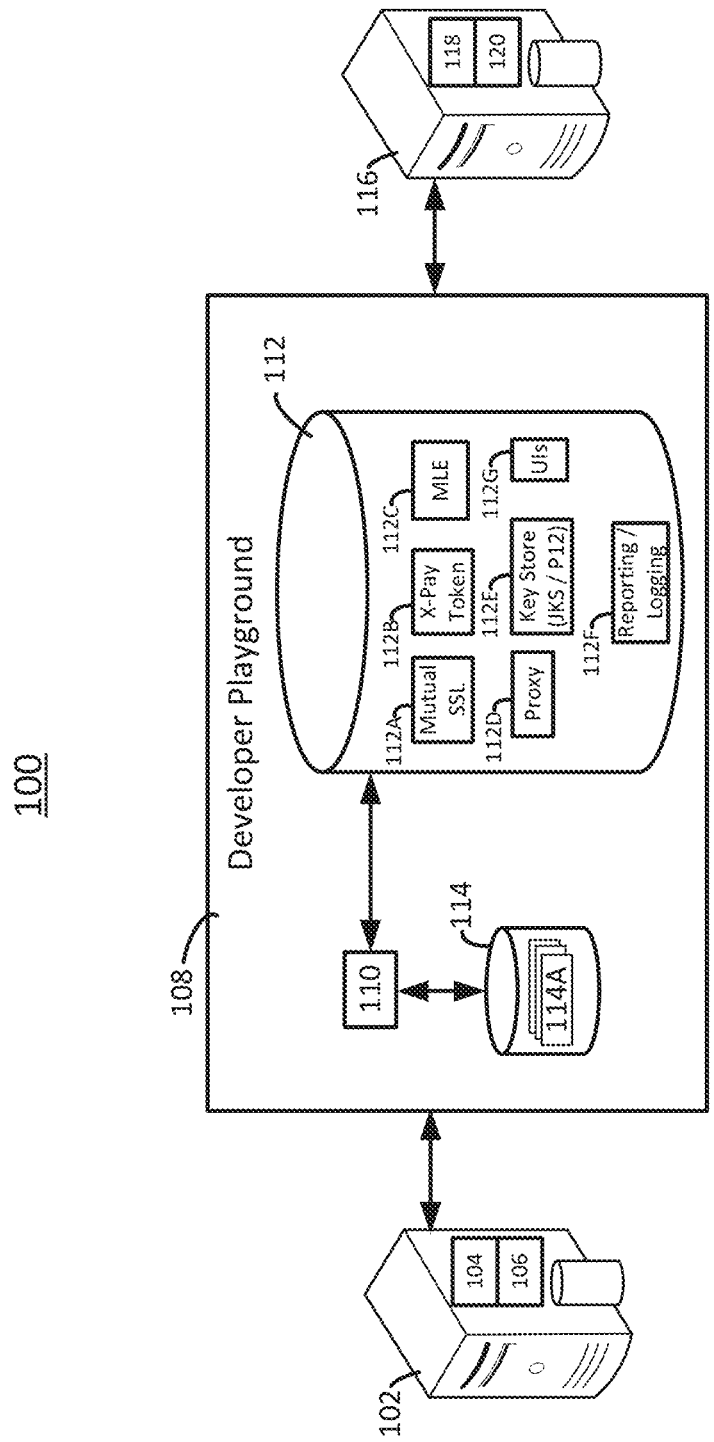
FIG. 1 shows an illustration of an exemplary developer playground environment that supports various authentication methods to test APIs that are exposed in the developer platform.

FIG. 1 generally illustrates one embodiment of an application programming interface (API) developer system 100 for developing and testing APIs with various authentication methods without developing separate code for testing these specific authentication methods outside the system 100. In some embodiments, the system 100 includes a developer computer system 102 having a processor 104 for executing processor-executable instructions of various modules that are stored in processor-readable memories of the system 100, such as memory 106. The developer computer system 102 may be functionally connected via a computer network to a developer playground 108. For example, the developer computer system 102 may cause the processor 104 to execute instructions stored in its computer memory 106 to implement an instance of the developer playground 108 and corresponding user interfaces of the developer playground (e.g., UIs 112G and FIGS. 3A, 3B, and 3C).

The developer playground 108 may include an integrated development environment (IDE), software framework, or other set of processor-executable instructions for execution directly on the developer computer system 102 or remotely via a computer network that provide features to computer programmers for software development. The developer playground 108 may also include a processor 110 and a memory 112 storing various modules 112A, 112B, 112C that each include instructions for execution by the processor(s) 104, 110 for incorporating various authentication methods into a secure API object 114A ("API") that may be stored within the playground 108 in a codebase 114 or in another local or remote repository.

Some features or modules of the playground 108 may include authentication modules 112A, 112B, and 112C. In some embodiments, a mutual SSL module 112A, an x-pay token module 112B, and an MLE module 112C may respectively include instructions for execution on the processor 110 for incorporating and testing Mutual SSL authentication features, x-pay token features, and/or MLE features into an API 114A. In further embodiments, the playground 108 may include a proxy module 112D that includes instructions for mediating communication and service requests between various computers, servers, modules, etc., of the system 100. For example, the proxy module 112D may include instructions for providing details for the system 100 and/or an API 114A to connect to a network. A key store module 112E may include instructions to generate security certificates such as JKS, P12, and other types of security certificates. A reporting/logging module 112F may include instructions to report and/or log events within and related to the system 100. For example, an update to an API 114A may be logged by the reporting/logging module 112F as well as requests to one or more of the authentication modules 112A, 112B, 112C to test authentication functions of an API 114A. A user interface module 112G may include instructions stored in a computer memory to render interfaces to the developer playground 108 on a display of the developer computer system 102.

The playground 108 may also include a source code editor, build automation tools, a debugger, and a compiler or interpreter (or both). The playground 108 may also include modules that provide generic functionality that a developer can selectively change by additional developer-written code to build application-specific software to meet particular client needs. The playground 108 may be communicatively coupled to a code repository 114 (i.e., a code base). The code repository 114 may include various code segments or APIs (e.g., API 114A) that each include computer code implementing or defining a set of subroutine definitions, communication protocols, and tools for building and maintaining software using the playground 108 such as an application programming interface (API).

The API 114 may include one or more configuration definitions and a generic schema for the API 114A that includes one or more "Uniform Resource Identifiers" (URIs) for configuration elements within the codebase 114. In some embodiments, each configuration definition includes a defined set of interactions corresponding to the API 114A that uses a known protocol and data format (e.g., the REST API and HTTP protocol using JSON or XML as the data format that is exchanged). For example, a data request might use an HTTP GET method, and a data record might use an HTTP POST method. The data format may be determined by the type of application that calls the API. The defined set of interactions for each configuration definition may determine how the corresponding API 114A behaves within its execution environment. The generic schema describes how the data for the respective API 114A is structured and includes URIs that include information to name a resource for the API 114A, or a resource name with a method of reaching it within the codebase 114. In some embodiments, a resource for the API 114A may include a security certificate within the key store module 112E.

An application server 116 may interface with various components of the developer playground 108 and include a processor 118 for executing processor-executable instructions of various modules that are stored in processor-readable memories of the system 100, such as memory 120. In some embodiments, the application server 116 may include an API layer while the developer playground may be a desktop client (see FIG. 3).

Figure 2:
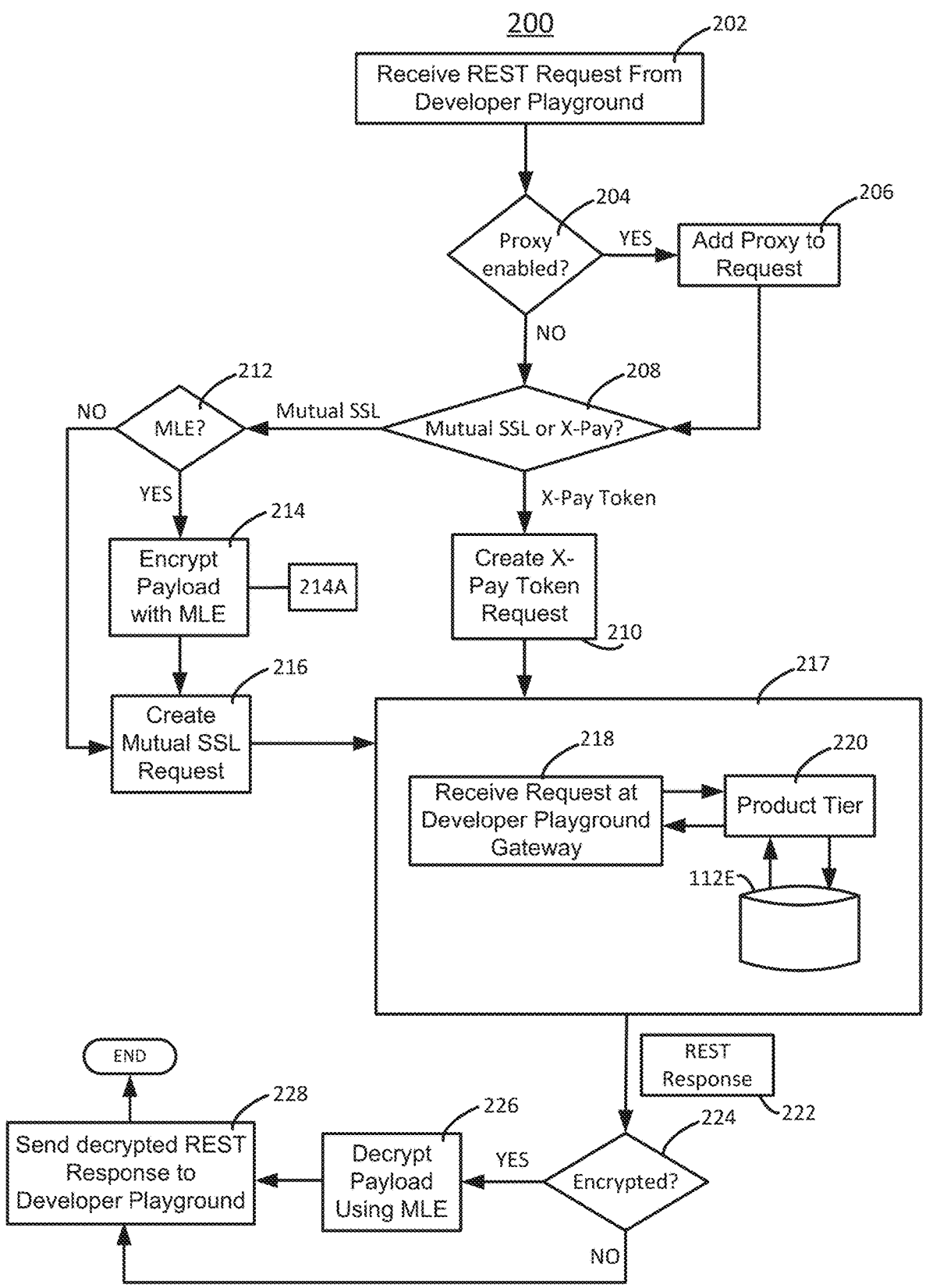
FIG. 2 shows an exemplary flowchart of a method for incorporating various authentication methods within secure API objects using the developer playground.

FIG. 2 shows an exemplary flowchart of a computer-implemented method for incorporating various authentication processes within the developer playground 108. Each step of the method 200 is one or more computer-executable instructions (e.g., modules, blocks, stand-alone instructions, etc.) performed on a processor (e.g., 104, 110) of a server or other computing device (e.g., developer computer system or developer playground 108 or other computer system) which may be physically configured to execute the different aspects of the method. Each step may include execution of any of the instructions as described in relation to the system 100 as part of the developer playground 108 or other component that is internal or external to the system 100. While the below blocks are presented as an ordered set, the various steps described may be executed in any particular order to complete the methods described herein.

At block 202, the method 200 may cause a processor to execute instructions stored in a computer memory to receive a request to expose resources of the developer playground 108 to build and configure an API 114A. In some embodiments, the request is a REST request. At block 204, the method 200 may cause a processor to execute instructions stored in a computer memory to determine if a proxy was enabled with the request received at block 202. If the request has the proxy enabled, then the method 200 may cause a processor to execute instructions stored in a computer memory to add proxy details to the request at block 206. If the request does not have the proxy enabled, then the method 200 may cause a processor to execute instructions stored in a computer memory to proceed to block 208. At block 208, the method 200 may cause a processor to execute instructions stored in a computer memory to determine a type of authentication method for the REST request. For example, the method 200 may execute instructions to determine whether the authentication method is Mutual SSL or an X-Pay Token. At block 210, if the authentication method includes an X-Pay token, then the method 200 may cause a processor to execute instructions stored in a computer memory to create an X-Pay token request. In some embodiments, the X-Pay token request includes instructions to access the developer playground 108 generally. The request created by block 210 may also employ an API key to retrieve the X-Pay token. In some embodiments, block 210 may cause a processor to execute instructions stored in a computer memory to retrieve the X-Pay token from the X-Pay Token module 112B. Block 210 may then cause a processor to execute instructions stored in a computer memory to send the request to a gateway server of the playground 108.

If, at block 208, the method 200 determines that the REST request includes Mutual SSL authentication, then the method 200 may proceed to block 212. At block 212, the method may cause a processor to execute instructions stored in a computer memory to determine if the REST request corresponds to an MLE-enabled API. At block 214, the method 200 may cause a processor to execute instructions stored in a computer memory to encrypt the REST request with specific MLE credentials from the MLE module 112C. For MLE encryption, the MLE credentials may include a key ID, current timestamp, a server encryption certificate, and a request payload. MLE encryption may include one or more encryption algorithms 214A. In some embodiments, the encryption algorithm includes one or more of a JSON Web Encryption (JWE) Algorithm (e.g., RSA OAEP 256) with A128GCM (e.g., Advanced Encryption Standard "AES" in Galois/Counter Mode "GCM" (NIST.800-38D) using a 128 bit key). The encryption algorithm may employ the server encryption certificate to encrypt the REST request at block 214.

At block 216, the method 200 may cause a processor to execute instructions stored in a computer memory to create a Mutual SSL request from the encrypted REST request of block 214 and send the request to the gateway server of the playground 108.

At block 217, the method 200 may cause a processor to execute instructions stored in a computer memory to process the request into a response via the application server 102. Block 217 denotes the modules and functions of the API layer which is the developer platform. The remaining blocks shown in FIG. 2 denote the Developer Playground utility as herein described. Blocks 218 and 220 as described herein may be executed via the application server 116, while the remaining blocks of the method 200 may be executed by the developer playground 108. At block 218, the method may cause a processor to execute instructions stored in a computer memory to receive the X-Pay Token from block 210 or the Mutual SSL request from block 216 at a gateway server of the platform 108 and communicate with a product tier 220 of the API 114A as well as other modules of the developer platform 108 to configure a REST response 222. In some embodiments, where the request includes an X-Pay token request, then the method 200 may cause a processor to execute instructions stored in a computer memory to configure the REST response as unencrypted. In further embodiments, where the REST request includes a Mutual SSL request (MLE or non-MLE), then the method 200 may cause a processor to execute instructions stored in a computer memory to configure the REST response as encrypted. For example, a Mutual SSL request may be processed into the REST response 222 via an Akamai server, an ARM processor of the developer platform (e.g., processor 110), and an MLE service checking for a key id, a timestamp, and a decrypt payload of the REST request.

At block 224, the method 200 may cause a processor to execute instructions stored in a computer memory to determine whether the REST response is encrypted (Mutual SSL) or unencrypted (X-Pay Token). At block 226, the method 200 may cause a processor to execute instructions stored in a computer memory to decrypt the encrypted REST response (Mutual SSL) using a private key. At block 228, the method 200 may cause a processor to execute instructions stored in a computer memory to send the decrypted REST response, whether Mutual SSL or X-Pay Token, to the developer playground 108.

Figure 3:
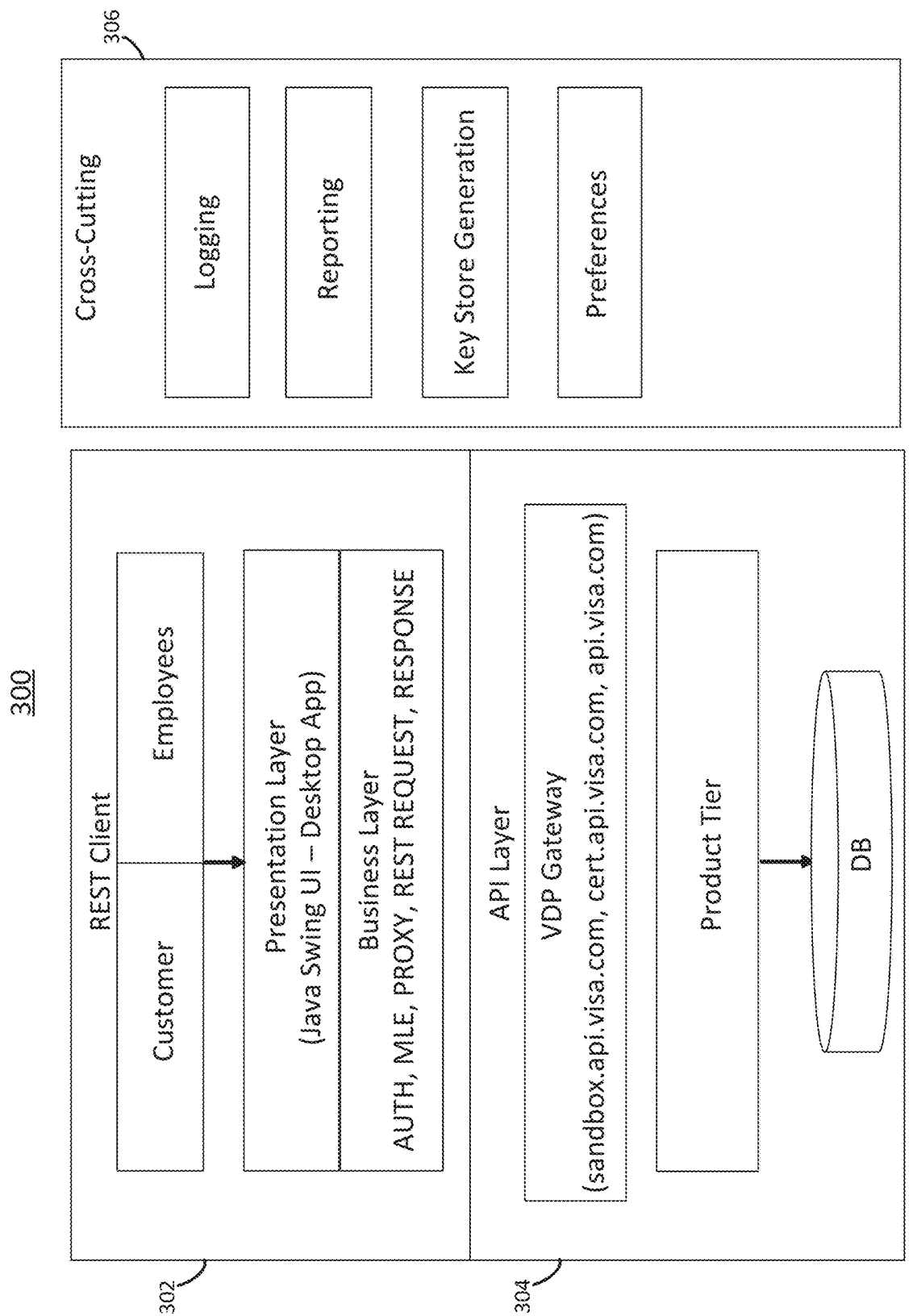
FIG. 3 shows an exemplary reference architecture for the developer playground.

FIG. 3 illustrates an exemplary reference architecture 300 for the system 100 and the various modules/blocks/components of the system and method as described herein. For example, the developer playground 108 and the various components and blocks described herein may also include instructions to function as a REST Client 302. Also, the application server 102 may include instructions to function as an API layer 304. Instructions for other blocks and components as described herein may be implemented by a combination of the REST Client 302 and API layer 304 as "cross-cutting" functions 306.

Figure 4A:
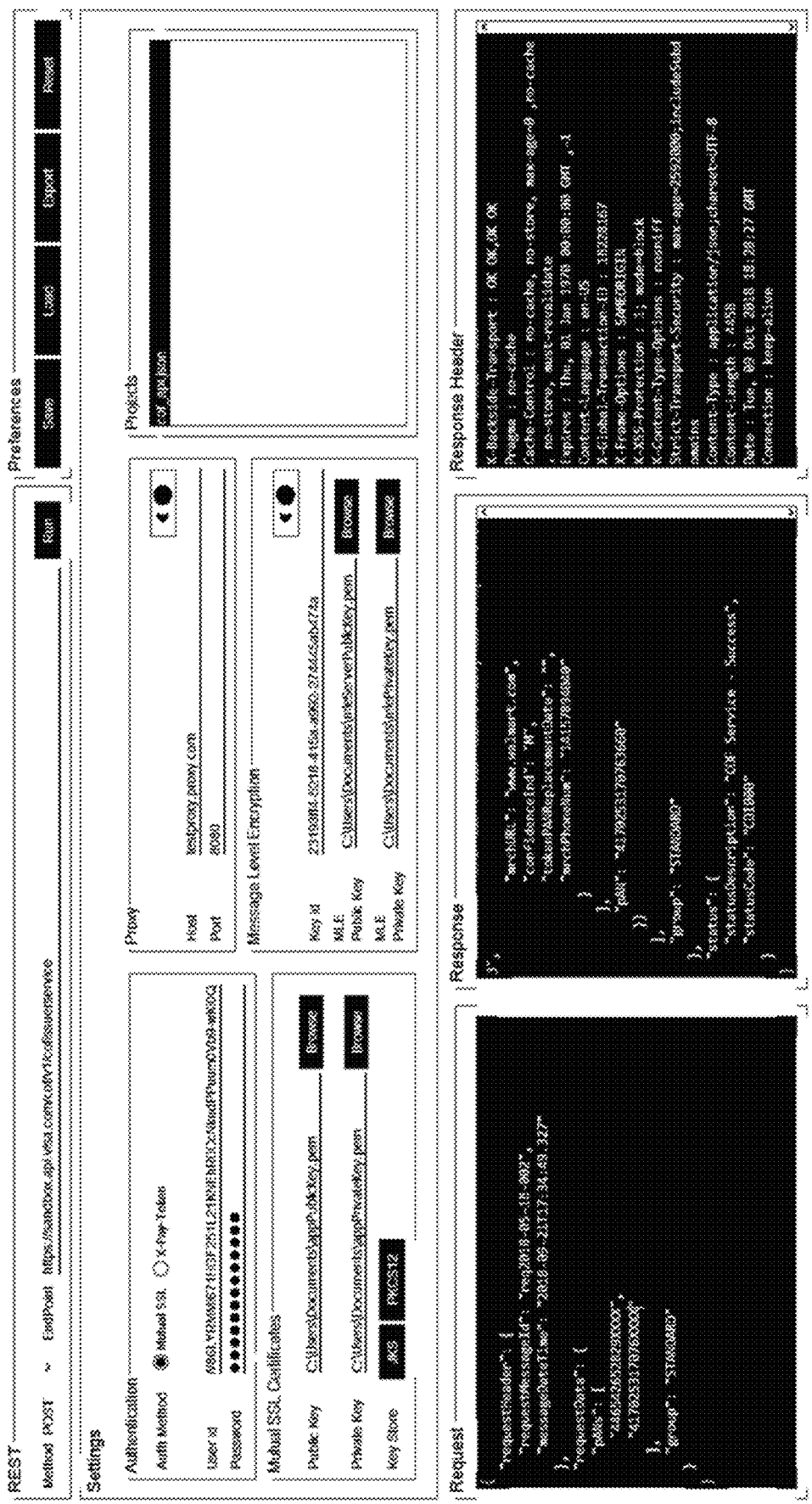
FIGS. 4A, 4B, and 4C each show exemplary user interfaces within the developer playground UI.
Figure 4B:
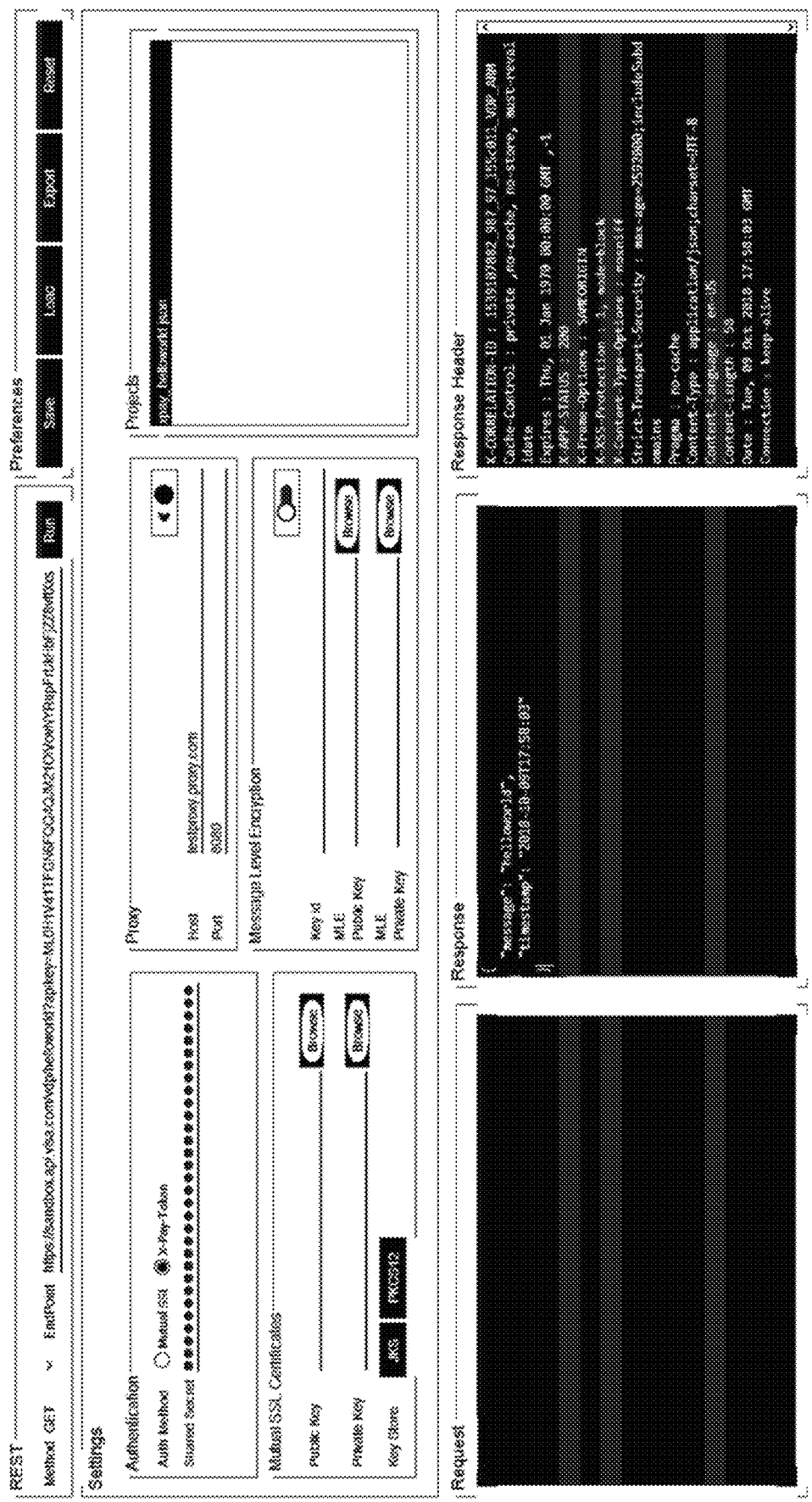
Figure 4C:
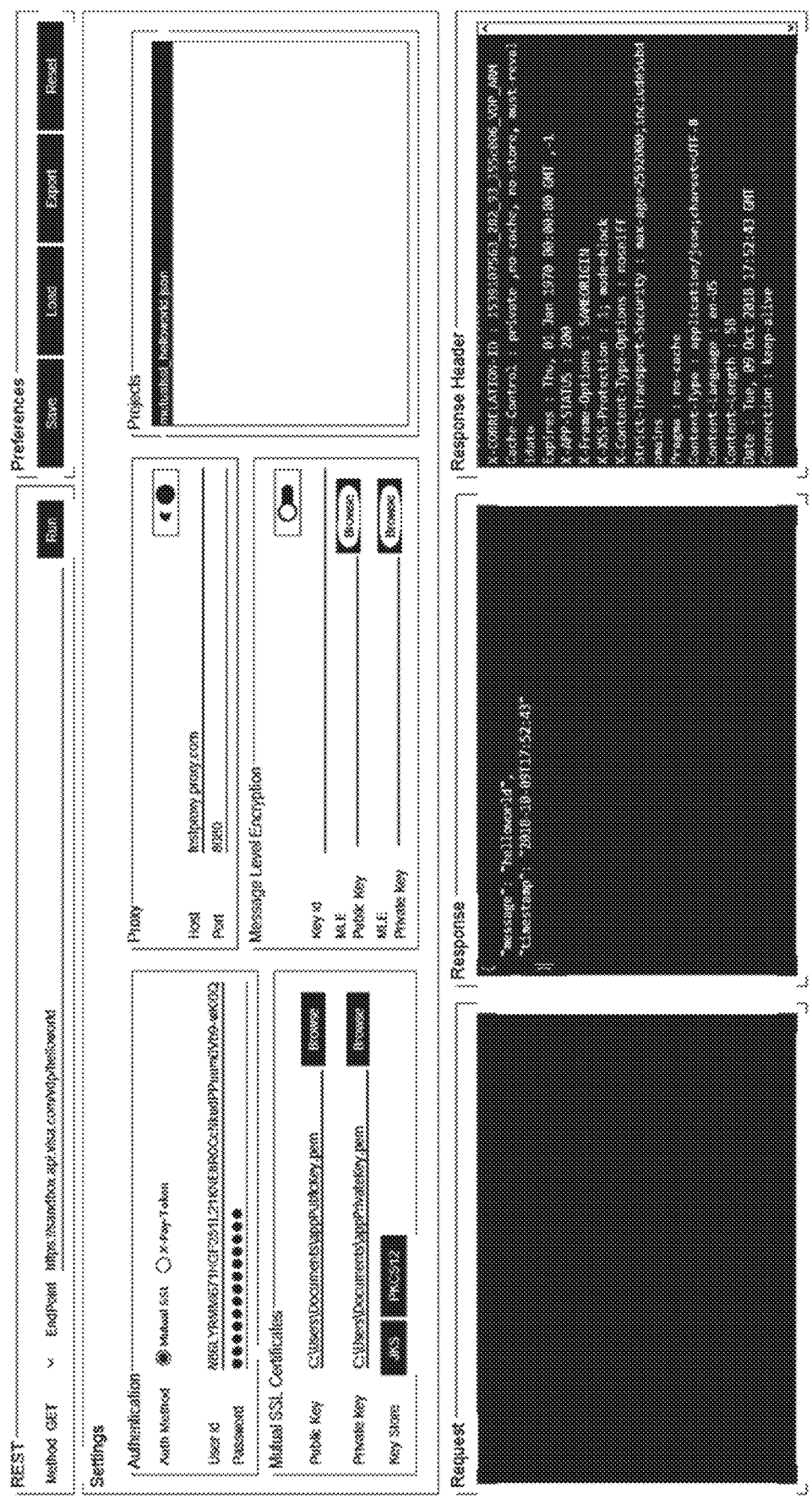

FIG. 4A illustrates an exemplary Mutual SSL with MLE user interface 400 for the developer playground 108 that may be displayed by the developer computer system 102 in response to a REST request including Mutual SSL with MLE, as described in relation to FIG. 2. FIG. 4B illustrates an exemplary X-Pay Token user interface 425 for the developer playground 108 that may be displayed by the developer computer system 102 in response to a REST request including an X-Pay Token, as described in relation to FIG. 2. FIG. 4C illustrates an exemplary Mutual SSL Authentication user interface 475 for the developer playground 108 that may be displayed by the developer computer system 102 in response to a REST request including Mutual SSL without MLE, as described in relation to FIG. 2.

Thus, the system 100 and method 200 provides a technical solution to the technical problem of writing separate code routines to test and troubleshoot APIs requiring encryption and decryption that are exposed through the developer platform. Various interfaces of the developer playground 108 (e.g., UIs 400 and 425) allow configuring cryptographic parameters in the development of APIs. For example, the systems and methods described herein configure MLE and X-Pay parameters, test MLE and X-Pay-supported APIs, and directly view decrypted output of APIs which requires MLE. Rather than a pre-configured key store or creating a key store for each API, the system may refer to downloaded credentials and certificates to make MLE and X-Pay token calls within the developer playground and create the key store programmatically. The configuration may be saved in a JSON format so that it may be reused at a later stage for retesting. Saving in JSON allows saving the complete configuration including credentials, end point, request and response payload so that there is no need to update credentials in a centralized place. As a standalone application, the solutions described herein may also eliminate the need to share the private key over a network. The solutions described herein may support testing APIs that include various authorization methods including Mutual SSL (MLE) and X-Pay token without needing any Groovy script to call an X-Pay token API, as well as MLE. The system herein may support generation of Keystore (112E) for usage with code or third party REST clients.

Figure 5:
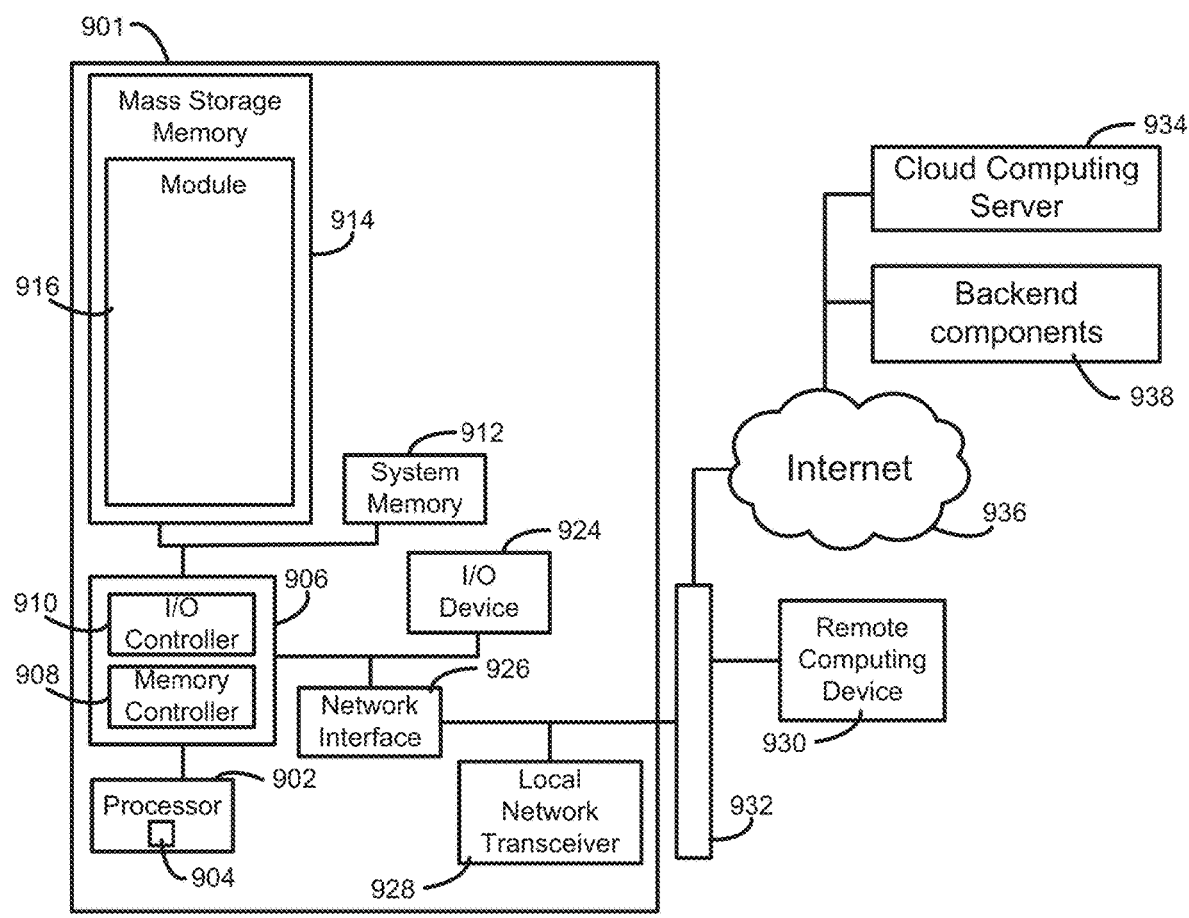
FIG. 5 shows an exemplary computing device that may be physically configured to execute the methods and include the various components described herein.

FIG. 5 is a high-level block diagram of an example computing environment 900 for the system 100 and methods (e.g., method 200) as described herein. The computing device 900 may include a server, a mobile computing device, a cellular phone, a tablet computer, a Wi-Fi-enabled device or other personal computing device capable of wireless or wired communication, a thin client, or other known type of computing device (e.g., the developer computer system 102, the developer playground 108, the application server 116, etc.). Logically, the computing device 900 may be designed and built to specifically execute certain tasks.

As will be recognized by one skilled in the art, in light of the disclosure and teachings herein, other types of computing devices can be used that have different architectures. Processor systems similar or identical to the example systems and methods described herein may be used to implement and execute the example systems and methods described herein. Although the example system 900 is described below as including a plurality of peripherals, interfaces, chips, memories, etc., one or more of those elements may be omitted from other example processor systems used to implement and execute the example systems and methods. Also, other components may be added.

As shown in FIG. 4, the computing device 901 includes a processor 902 that is coupled to an interconnection bus. The processor 902 includes a register set or register space 904, which is depicted in FIG. 4 as being entirely on-chip, but which could alternatively be located entirely or partially off-chip and directly coupled to the processor 902 via dedicated electrical connections and/or via the interconnection bus. The processor 902 may be any suitable processor, processing unit or microprocessor. Although not shown in FIG. 4, the computing device 901 may be a multi-processor device and, thus, may include one or more additional processors that are identical or similar to the processor 902 and that are communicatively coupled to the interconnection bus.

The processor 902 of FIG. 4 is coupled to a chipset 906, which includes a memory controller 908 and a peripheral input/output (I/O) controller 910. As is well known, a chipset typically provides I/O and memory management functions as well as a plurality of general purpose and/or special purpose registers, timers, etc. that are accessible or used by one or more processors coupled to the chipset 906. The memory controller 908 performs functions that enable the processor 902 (or processors if there are multiple processors) to access a system memory 912 and a mass storage memory 914, that may include either or both of an in-memory cache (e.g., a cache within the memory 912) or an on-disk cache (e.g., a cache within the mass storage memory 914).

The system memory 912 may include any desired type of volatile and/or non-volatile memory such as, for example, static random access memory (SRAM), dynamic random access memory (DRAM), flash memory, read-only memory (ROM), etc. The mass storage memory 914 may include any desired type of mass storage device. For example, the computing device 901 may be used to implement a module 916 (e.g., the various modules as herein described). The mass storage memory 914 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 901, the systems and methods described herein. Thus, a module, block, function, operation, procedure, routine, step, and method can be implemented in hardware, firmware, and/or software. In one embodiment, program modules and routines are stored in mass storage memory 914, loaded into system memory 912, and executed by a processor 902 or can be provided from computer program products that are stored in tangible computer-readable storage mediums (e.g. RAM, hard disk, optical/magnetic media, etc.).

The peripheral I/O controller 910 performs functions that enable the processor 902 to communicate with a peripheral input/output (I/O) device 924, a network interface 926, a local network transceiver 928, (via the network interface 926) via a peripheral I/O bus. The I/O device 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 924 may be used with the module 916, etc., to receive data from the transceiver 928, send the data to the components of the system 100, and perform any operations related to the methods as described herein. The local network transceiver 928 may include support for a Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 908 and the I/O controller 910 are depicted in FIG. 4 as separate functional blocks within the chipset 906, the functions performed by these blocks may be integrated within a single integrated circuit or may be implemented using two or more separate integrated circuits. The computing environment 900 may also implement the module 916 on a remote computing device 930. The remote computing device 930 may communicate with the computing device 901 over an Ethernet link 932. In some embodiments, the module 916 may be retrieved by the computing device 901 from a cloud computing server 934 via the Internet 936. When using the cloud computing server 934, the retrieved module 916 may be programmatically linked with the computing device 901. The module 916 may be a collection of various software playgrounds including artificial intelligence software and document creation software or may also be a Java® applet executing within a Java® Virtual Machine (JVM) environment resident in the computing device 901 or the remote computing device 930. The module 916 may also be a "plug-in" adapted to execute in a web-browser located on the computing devices 901 and 930. In some embodiments, the module 916 may communicate with back end components 938 via the Internet 936.

The system 900 may include but is not limited to any combination of a LAN, a MAN, a WAN, a mobile, a wired or wireless network, a private network, or a virtual private network. Moreover, while only one remote computing device 930 is illustrated in FIG. 4 to simplify and clarify the description, it is understood that any number of client computers are supported and can be in communication within the system 900.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A processor-implemented method for implementing encryption and decryption in an application programming interface (API) developer platform comprising processor-implemented instructions for:
receiving a representational state transfer (REST) request for a secure API object;
determining an authentication method for the secure API object, the authentication method including an X-Pay token or Mutual SSL;
in response to determining that the authentication method includes an X-Pay Token:
creating an X-Pay Token request for the secure API object using a shared secret key and an API key,
converting the X-Pay Token to an X-Pay Token REST response, and
sending the X-Pay Token REST response including the X-Pay Token to the API developer playground in reply to the REST request; and
in response to determining that the authentication method includes Mutual SSL:
further determining whether the secure API object is MLE-enabled,
encrypting a portion of the REST request using an MLE credential,
creating a Mutual SSL request for the secure API object using at least a Mutual SSL certificate and a Mutual SSL credential,
converting the Mutual SSL request to a Mutual SSL REST response, the Mutual SSL REST response including an encrypted payload,
decrypting the payload of the REST response using Message Level Encryption, and
sending the Mutual SSL REST response including the decrypted payload to the API developer playground in reply to the REST request.

2. The processor-implemented method of claim 1, further comprising processor-implemented instructions for determining that a proxy is enabled for the secure API object.

3. The processor-implemented method of claim 2, further comprising processor-implemented instructions for adding the proxy to the REST request.

4. The processor-implemented method of claim 1, wherein the authentication method consists of either X-Pay Token or Mutual SSL.

5. The processor-implemented method of claim 1, wherein the MLE credential consists of a key ID, a current timestamp for the REST request, a server encryption certificate, and a REST request payload.

6. The processor-implemented method of claim 5, wherein encrypting the portion of the REST request using the MLE credential includes executing a JSON Web Encryption algorithm with A128GCM using the server encryption certificate.

7. The processor-implemented method of claim 1, wherein sending the REST response including the X-Pay Token to the API developer playground in reply to the REST request includes configuring the REST response including the X-Pay Token as unencrypted.

8. The processor-implemented method of claim 1, wherein sending the REST response including the decrypted payload to the API developer playground in reply to the REST request includes configuring the REST response as encrypted.

9. The processor-implemented method of claim 8, wherein configuring the REST response as encrypted includes processing the REST response via one or more of an Akamai server, an ARM processor of the API developer playground, and an MLE service checking for a key id, a timestamp, and a decrypt payload of the REST request.

10. The processor-implemented method of claim 9, further comprising instructions for decrypting the encrypted REST response using a private key certificate.

11. A system for implementing encryption and decryption in an application programming interface (API) developer playground comprising:
at least one processor and memory including instructions that are executable by the processor for:
receiving a representational state transfer (REST) request for a secure API object;
determining an authentication method for the secure API object, the authentication method including an X-Pay token or Mutual SSL;
in response to determining that the authentication method includes an X-Pay Token:
creating an X-Pay Token request for the secure API object using a shared secret key and an API key,
converting the X-Pay Token to an X-Pay Token REST response, and
sending the REST response including the X-Pay Token to the API developer playground in reply to the REST request; and
in response to determining that the authentication method includes Mutual SSL:
further determining whether the secure API object is MLE-enabled,
encrypting a portion of the REST request using an MLE credential,
creating a Mutual SSL request for the secure API object using at least a Mutual SSL certificate and a Mutual SSL credential,
converting the Mutual SSL Request to a Mutual SSL REST response, the Mutual SSL REST response including an encrypted payload,
decrypting the payload of the REST response using Message Level Encryption, and
sending the Mutual SSL REST response including the decrypted payload to the API developer playground in reply to the REST request.

12. The system of claim 11, further comprising instructions for determining that a proxy is enabled for the secure API object.

13. The system of claim 12, further comprising instructions for adding the proxy to the REST request.

14. The system of claim 11, wherein the authentication method consists of either X-Pay Token or Mutual SSL.

15. The system of claim 11, wherein the MLE credential consists of a key ID, a current timestamp for the REST request, a server encryption certificate, and a REST request payload.

16. The system of claim 15, wherein the instruction for encrypting the portion of the REST request using the MLE credential includes instructions for executing a JSON Web Encryption algorithm with A128GCM using the server encryption certificate.

17. The system of claim 11, wherein the instruction for sending the REST response including the X-Pay Token to the API developer playground in reply to the REST request includes instructions for configuring the REST response as unencrypted.

18. The system of claim 11, wherein the instruction for sending the REST response including the decrypted payload to the API developer playground in reply to the REST request includes instructions for configuring the REST response as encrypted.

19. The system of claim 18, wherein the instruction for configuring the REST response as encrypted includes instructions for processing the REST response via one or more of an Akamai server, an ARM processor of the API developer playground, and an MLE service checking for a key id, a timestamp, and a decrypt payload of the REST request.

20. The system of claim 19, further comprising instructions for decrypting the encrypted REST response using a private key certificate.

* * * * *